United States Patent
Beems Hart et al.

(10) Patent No.: US 8,780,813 B2
(45) Date of Patent: Jul. 15, 2014

(54) WIRELESS COMMUNICATION SYSTEMS AND METHODS AND A BASE STATION COMMUNICATING WITH A PLURALITY OF SUBSCRIBER STATIONS

(75) Inventors: Michael John Beems Hart, London (GB); Kevin Power, West Dayton (GB)

(73) Assignee: Fujitsu Limited, Kawasaki (JP)

( * ) Notice: Subject to any disclaimer, the term of this patent is extended or adjusted under 35 U.S.C. 154(b) by 1249 days.

(21) Appl. No.: 12/241,737

(22) Filed: Sep. 30, 2008

(65) Prior Publication Data

US 2009/0092090 A1  Apr. 9, 2009

(30) Foreign Application Priority Data

Oct. 4, 2007 (GB) .................................... 0719440

(51) Int. Cl.
*H04W 4/00* (2009.01)

(52) U.S. Cl.
USPC .......................................... 370/329; 370/330

(58) Field of Classification Search
USPC .......................................................... 370/329
See application file for complete search history.

(56) References Cited

U.S. PATENT DOCUMENTS

| | | | |
|---|---|---|---|
| 7,664,087 B2 * | 2/2010 | Cho et al. ....................... | 370/338 |
| 2004/0246983 A1 * | 12/2004 | Kaatz ............................. | 370/432 |
| 2005/0286465 A1 * | 12/2005 | Zhuang ......................... | 370/329 |
| 2006/0007849 A1 | 1/2006 | Kim et al. | |
| 2006/0153112 A1 * | 7/2006 | Lim et al. ....................... | 370/310 |
| 2006/0153227 A1 * | 7/2006 | Hwang et al. ................ | 370/465 |
| 2008/0080553 A1 * | 4/2008 | Hasty et al. ................... | 370/468 |

(Continued)

FOREIGN PATENT DOCUMENTS

| | | |
|---|---|---|
| EP | 1679932 | 7/2006 |
| WO | 2005/088886 | 9/2005 |
| WO | 2006/070466 | 7/2006 |
| WO | 2006/075870 | 7/2006 |

OTHER PUBLICATIONS

IEEE Std 802.16-2004 (Revision of IEEE Std 802.16-2001) Air Interface for Fixed Broadband Wireless Access Systems, Oct. 1, 2004.

(Continued)

*Primary Examiner* — Shaq Taha
(74) *Attorney, Agent, or Firm* — Myers Wolin, LLC (57) ABSTRACT

A signalling mechanism in an OFDMA-based wireless communication system in which the number of bits used to indicate the 2-D resource allocation in each frame are reduced, and optimised for the particular frame configuration. The numbers of bits within the MAP-IEs in at least the DL_MAP and optionally also the UL_MAP of each frame, used to represent the Symbol offset and No. of Symbols, are scaled to the frame duration and the subcarrier allocation scheme used for the zone to which the DL-MAP_IE is associated. Likewise, a variable number of bits is used for the subchannel offset and number of subchannels, which can be optimised based on the selected FFT size and subcarrier allocation scheme. The bit numbers in use can be TLV encoded and transmitted within a downlink channel descriptor following the DL_MAP and UL_MAP. Therefore, in subsequent frames each subscriber station knows the number of bits being used to represent these parameters, and thus the field sizes in the MAP_IEs, until such time as the DCD is updated. In this way, the signalling overhead incurred by the MAP_IEs, which can be very significant for a large number of users and with some frame and FFT sizes, is reduced.

11 Claims, 3 Drawing Sheets

(56) References Cited

U.S. PATENT DOCUMENTS

2008/0232319 A1    9/2008  Son et al.
2008/0298315 A1*  12/2008  Ihm et al. .................... 370/329
2009/0092085 A1*  4/2009  Ramesh et al. ............. 370/329

OTHER PUBLICATIONS

IEEE Std 802.16e-2005 and IEEE Std 802.16-2004/Cor Jan. 2005 (Amendment and Corrigendum to IEEE Std 802.16-2004), Air Interface for Fixed and Mobile Broadband Wireless Access Systems, Amendment 2: Physical and Medium Access Control Layers for Combined Fixed and Mobile Operation in Licensed Bands, Feb. 28, 2006.

UK Intellectual Property Office Search Report for corresponding GB Application No. GB0719440.0; date of search Nov. 20, 2007.

European Search Report issued for corresponding European Patent Application No. EP08164815, dated Oct. 9, 2009.

Desset C. et al.; "WiMAX Downlink OFDMA Burst Placement for Optimized Receiver Duty-Cycling"; Communications, 2007, ICC '07, IEEE International Conference on, IEEE, PI; Jun. 1, 2007; (Jun. 1, 2007), pp. 5149-5154, XP031126484; [Ref.: ESR dated Oct. 9, 2009].

Notification of Reasons for Refusal issued for corresponding Japanese Patent Application No. 2008-258484, mailed Dec. 11, 2012, with English translation.

* cited by examiner

WIRELESS COMMUNICATION SYSTEMS AND METHODS AND A BASE STATION COMMUNICATING WITH A PLURALITY OF SUBSCRIBER STATIONS

FIELD OF THE INVENTION

The present invention relates to wireless communication systems of the type in which a base station (BS) communicates with multiple fixed or mobile subscriber stations (MS), and more particularly to control signalling required for resource allocation within such systems.

BACKGROUND OF THE INVENTION

Recently, various standards have been developed for data communication over broadband wireless links. One such standard is set out in the IEEE 802.16 specifications and is commonly known as WiMAX. The specifications include IEEE 802.16-2004, primarily intended for systems having fixed subscriber stations, and IEEE 802.16e-2005 which among other things provides for mobile subscriber stations. In the following description, the abbreviation MS is used as shorthand for both mobile and fixed subscriber stations. The term "user" is also used equivalently to mobile or fixed subscriber station.

The entire contents of IEEE Std 802.16-2004 "Air Interface for Fixed Broadband Wireless Access Systems" and IEEE Std 802.16e-2005 "Amendment 2 and Corrigendum 1 to IEEE Std 802.16-2004" are hereby incorporated by reference. IEEE 802.16 defines wireless communication systems in which the mobile stations communicate with a base station within range, the range of a base station defining at least one "cell". By deploying base stations at suitable positions within a given geographical area, and/or by providing multiple antennas in the same base station, a contiguous group of cells can be created to form a wide-area network. In this specification, the terms "network" and "system" will be used equivalently.

In systems of the above type, data is communicated by exchange of packets between the mobile stations and base station whilst a connection (management connection or transport connection) is maintained between them. The direction of transmission of packets from the subscriber station to the base station is the uplink (UL), and the direction from the base station to the subscriber station is the downlink (DL). The packets have a defined format which follows a layered protocol applied to the system and its component radio devices. Protocol layers relevant to packets as such are the so-called physical layer (PHY) and media access layer (MAC).

The media access layer is responsible for handling various functions including network access, bandwidth allocation, and maintaining connections. This includes controlling access of the BS and SS's to the radio medium on the basis of "frames" which are the predetermined unit of time in the system, and which are divided in the time and frequency domain into a number of "slots" (see below), and when utilising multiple transmit antennas may also be divided spatially into a number of streams.

A connection between a base station and subscriber station (more precisely, between MAC layers in those devices—so-called peer entities) is assigned a connection ID (CID) and the base station keeps track of CIDs for managing its active connections or service flows. A service flow could represent, for example, a voice call conducted by the user of the MS. In addition, base stations and mobile stations have their own identifying codes (BSID for the BS, MS MAC address or basic CID for the MS).

Various physical layer implementations are possible in an IEEE 802.16 network, depending on the available frequency range and application; for example, a time division duplex (TDD) mode and a frequency division duplex (FDD) mode as described below. The PHY layer also defines the transmission technique such as OFDM (orthogonal frequency division multiplexing) or OFDMA (orthogonal frequency division multiple access), which techniques will now be outlined briefly.

In OFDM, a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each sub-carrier is less than the coherence bandwidth of the channel. As a result, the channel distortion experienced on a signal sub-carrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

An OFDM system uses a plurality of sub-carrier frequencies (subcarriers) which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. At the receiver, the received time-domain signal is transformed back to frequency domain by applying Discrete Fourier Transform (DFT) or Fast Fourier Transform (FFT) algorithm. Not all of the subcarriers are available to carry data; for example, in an IEEE802.16-2004 fixed WiMAX system employing 256 sub-carriers, 192 may be available for data, 8 used as pilot sub-carriers for channel estimation and synchronisation, and the remainder used as guard band subcarriers.

OFDMA (Orthogonal Frequency Division Multiple Access) is a multiple access variant of OFDM. It works by assigning a subset of the sub-carriers to an individual subscriber. This allows simultaneous transmission from several users leading to better spectral efficiency. However, there is still the issue of allowing bi-directional communication, that is, in the uplink and download directions, without interference. In order to enable bi-directional communication between two nodes, two well known different approaches exist for duplexing the two (forward or downlink and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for DL and the other for UL communications. The second, time division duplexing (TDD), involves operating the two links on the same frequency band, but subdividing the access to the medium in time so that only the DL or the UL will be utilizing the medium at any one point in time. Although both approaches have their merits and the IEEE802.16 standard incorporates both an FDD and TDD mode, the remainder of this description will mainly refer to the TDD mode.

A variant of OFDMA, with which the present invention is particularly concerned, is scaleable OFDMA or SOFDMA. In SOFDMA the FFT size, or number of used subcarriers, is scaled based on the bandwidth of the channel that the system is to occupy. The IEEE802.16e specification defines FFT sizes of 128, 512, 1024 and 2048, so that the SOFDMA PHY can be used in channels ranging from 1.25 MHz to 20 MHz without having to significantly alter the subcarrier spacing, which can be optimized based on the propagation channel conditions (i.e mobility and fading) In addition, OFDMA provides a number of "subcarrier allocation" schemes that define how the physical subcarriers are grouped into logical subchannels. One method of subcarrier allocation is called frequency diverse transmission, where a logical subchannel includes subcarriers distributed over the whole frequency range (this is called Full Usage of Subcarriers or FUSC) or distributed within some subset of the subcarriers (Partial Usage of Subcarriers or PUSC). Another subcarrier allocation method—Band Adaptive Modulation and Coding, or AMC, forms subchannels by grouping physically-adjacent subcarriers. The same frame can employ both techniques within separate "zones" in the time dimension. Resources in an OFDMA system are allocated in units of slots as mentioned above. Each slot consists of one subchannel over one, two or three OFDM symbols, depending on the subcarrier allocation scheme used.

Figure 1:
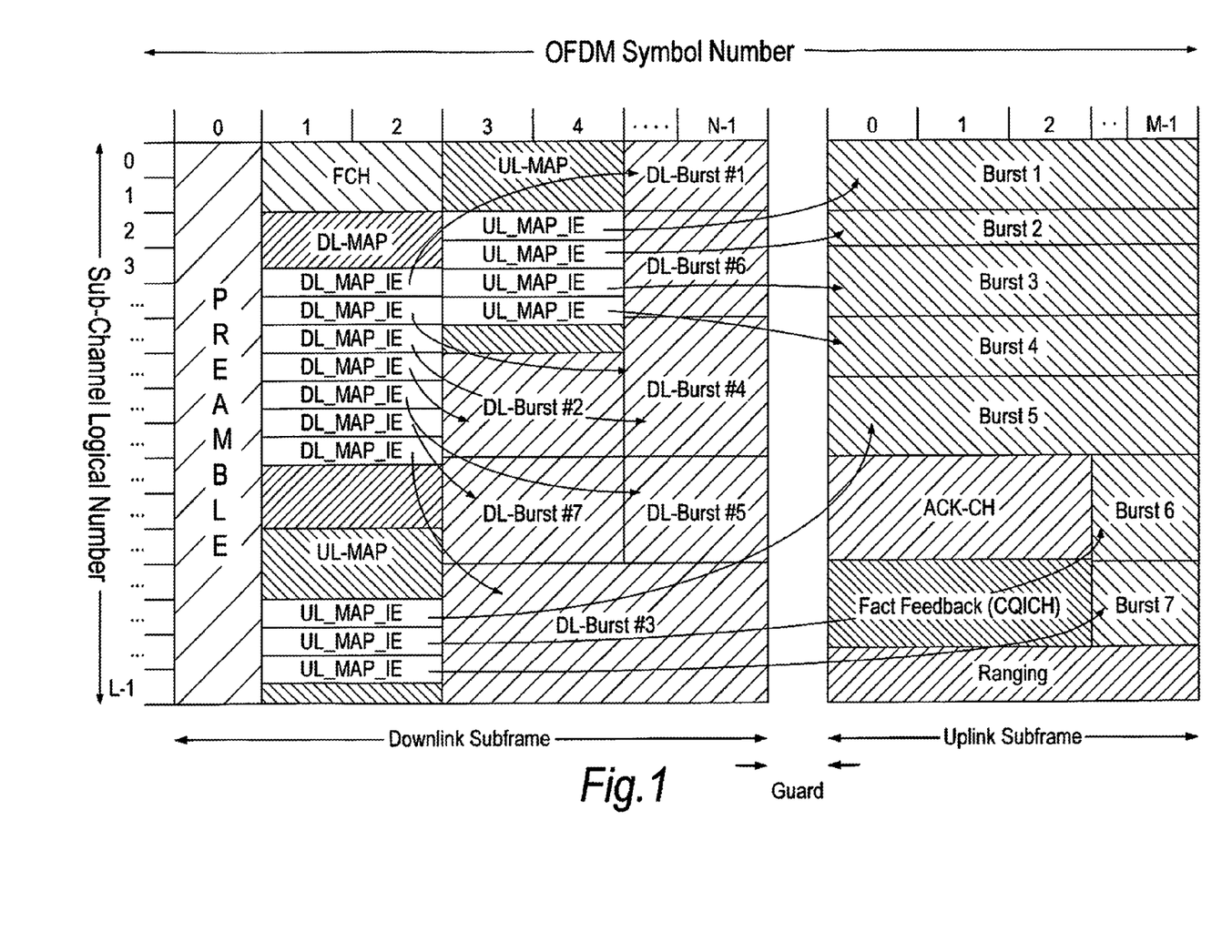
FIG. 1 shows the frame structure in a proposed TDD OFDMA wireless communication system according to IEEE802.16e-2005.

The OFDMA PHY also encompasses the modulation and forward error correction (FEC) coding techniques used in the various bursts. Typically the type of modulation and coding rate will depend on the range of the user from the cell site and the signal propagation environment, that is, on how strongly signals from the BS are received at the MS, as this determines the data rate achievable between the BS and MS. One measure of this is the signal to noise-plus-interference ratio experienced by each user. For users with high SINR, quadrature amplitude modulation with 64 levels (64QAM) with high rate convolutional turbo coding (e.g. 5/6) can be used. The BS may employ a more robust QAM (16QAM) and/or code rate for users with lower SINR, and proceeding further to QPSK and/or lower code rates for users with even lower SINR. The BS can use a different modulation technique for each user's downlink and uplink bursts. By selecting an appropriate modulation technique, errors in transmission can be minimized and link efficiency optimized. FIG. 1 illustrates the TDD frame structure used in the OFDMA physical layer mode of the IEEE802.16e-2005 standard (WiMAX). The OFDMA physical layer divides the available OFDM symbols and component subcarriers (see FIG. 1) into distinct logical and physical subchannels using the above subcarrier allocation techniques, allowing multiple bursts to co-exist in each time interval. Each frame is divided into DL and UL subframes, each being a discrete transmission interval. On the downlink DL, a single burst may be shared by several users (subscriber stations) but on the uplink UL, each burst generally corresponds to a single user. In a WiMAX system the DL subframe can contain zones for FUSC, PUSC and AMC and the UL subframe can contain zones with PUSC or AMC. In FIG. 1, the frame can be considered to occupy a given length of time and a given frequency band, the time dimension being denoted in FIG. 1 by "OFDMA symbol number", and the frequency dimension by "subchannel logical number" (each subchannel is a set of the sub-carriers referred to above). The subframes are separated by a Transmit/Receive and Receive/Transmit Transition Guard interval or Gap (TTG and RTG respectively). The TTG and RTG allow time for the BS and MSs to switch between receive and transmit modes. Each DL subframe starts with a preamble followed by the Frame Control Header (FCH), the DL-MAP, and, if present, the UL-MAP. The FCH contains a DL Frame Prefix (DLFP) to specify the burst profile and the length of the DL-MAP. The DLFP is a data structure transmitted at the beginning of each frame and contains information regarding the current frame; it is mapped to the FCH. DL allocations can be broadcast, multicast and unicast and they can also include an allocation for another BS rather than a serving BS.

The DL-subframe includes a broadcast control field with a DL-MAP and UL-MAP, by which the BS informs the receiving device of the frame structure. The MAP is a map of bandwidth allocation in the frame and also contains other PHY signalling related messages. It consists of Information Elements (MAP_IEs) as shown in FIG. 1, each containing a connection ID. The MAP_IEs inform mobile stations to which burst(s) their connections have been assigned to transmit and receive information. Thus, in a TDD and FDD mode network, bandwidth allocation means the allocation of resources (slots) within frames.

Each DL burst has a "2-D" structure, having a defined extent in both frequency and time dimensions. Thus, the MAP_IE has to inform the MS concerned of not only the part of the frequency spectrum (frequency band), but also the portion of the subframe duration, in which the burst is placed. This information is provided in the form of a subchannel offset (frequency) relative to the 0-th logical subchannel, and a symbol offset (time) relative to the start of the subframe. In the example of FIG. 1, each MS is allocated a 2-D burst within the DL subframe, for transmitting data on the downlink from the BS to the MS. As for the uplink, current WiMAX standards define UL allocations as extending across the whole duration of the relevant zone, which may be the whole subframe if only 1 zone is defined, roughly as illustrated in FIG. 1, but with a snake-like pattern (not shown) such that the allocation to a single connection may carry over to the next frequency band. Thus, in general definition of the UL allocation is simpler than defining the DL allocation as only a duration parameter is required, and in the case of AMC, also an offset in terms of slots from the previous allocation. Respective MAP_IEs link the bursts to respective connections of mobile stations, as indicated by arrows in the Figure. In the case of services such as video streaming, the amount of resource allocation on the downlink may need to be many times as large as that on the uplink.

FIG. 1 shows an example in which seven users are allocated one burst each within both DL and UL subframes, in which the signalling via MAP_IEs is already somewhat complex, but a practical system may need to serve more users concurrently in the same frame, or a single user may occupy more than burst. Thus, the number of MAP_IEs may grow large, increasing the proportion of the DL subframe taken up by controlling signalling and reducing the proportion available for data.

Accordingly, there is a need to improve the signalling mechanism in systems of the above type, especially if they are extended to support larger system bandwidths.

SUMMARY OF THE INVENTION

According to a first aspect of the present invention, there is provided a wireless communication method in which a base station communicates with a plurality of subscriber stations in units of frames, each frame being configured to have a certain duration in time comprising a plurality of symbols, a certain frequency bandwidth comprising a total number of subcarriers or subchannels, and at least one subcarrier allocation scheme for grouping the subcarriers into subchannels, each frame containing a burst allocated to each of the subscriber stations respectively and each burst occupying a corresponding subset of said symbols and subchannels, In this method, preferably, each of the subscriber stations is informed of the characteristics of its allocated burst by a respective control message comprising one or more fields sent from the base station; the method comprising the step of varying the lengths of one or more fields comprised in the control messages in dependence upon the frame configuration currently in use.

Each control message may include a first field defining a symbol offset of the burst, and a number of bits in this field is set in dependence upon the frame duration and the subcarrier allocation scheme.

Each control message may include, in addition to or in place of the first field mentioned above, a second field defining a number of symbols in the burst, and a number of bits in this field is set in dependence upon the frame duration and the subcarrier allocation scheme.

Each control message may include, or may also include, a third field defining a subchannel offset of the burst, and a number of bits in this field is set in dependence upon the total number of subchannels.

Each control message may include, or also include, a fourth field defining a number of subchannels in the burst, and a number of bits in this field is set in dependence upon the total number of subchannels.

In a preferred embodiment the frame configuration further comprises a plurality of zones using different subcarrier allocation schemes for transmissions between the base station and the subscriber stations, and the numbers of bits in the first and second fields depend on the subcarrier allocation scheme used for the zone to which the burst belongs.

Preferably also, each frame includes a downlink subframe and a uplink subframe and said control messages are contained in map information elements of at least a downlink map contained in the downlink subframe. Different subcarrier allocation schemes may be employed within respective zones of the downlink subframe; these may include a Partial Use of Subcarriers zone and a Adaptive Modulation and Coding zone.

The method may further comprise the step of the base station specifying, in at least one said frame, information specifying the lengths of said one or more fields which are varied. Moreover, the method may further comprise a step of changing the frame configuration currently in use to another frame configuration having a different time duration, frequency bandwidth, and/or subcarrier allocation scheme, and the base station newly specifying, in the next frame, said information specifying the lengths of said one or more fields. In this embodiment, preferably, after carrying out said specifying step in one frame, said specifying step is omitted for successive frames until the frame configuration currently in use is changed or a time-out for refresh is reached.

In a configuration in which each frame includes a downlink subframe and a uplink subframe, said information is preferably contained within a downlink channel descriptor of one downlink subframe. The information may be TLV-encoded.

According to a second aspect of the present invention, there is provided a wireless communication system in which a base station communicates with a plurality of subscriber stations in units of frames, each frame having a variable configuration comprising a defined duration in time including a plurality of symbols, a defined extent in frequency including a total number of subcarriers or subchannels, and at least one subcarrier allocation scheme for grouping the subcarriers into subchannels, each frame containing a burst allocated to each of the subscriber stations respectively and each burst defined by a corresponding subset of said symbols and subchannels, each of the subscriber stations being informed of the characteristics of its allocated burst by a respective control message sent from the base station; wherein the base station is arranged to construct each control message with a size dependent upon the frame configuration currently in use.

each control message includes one or more of:

a first field defining a symbol offset of the burst, a number of bits in this field being set to a minimum number required in view of the frame duration and the subcarrier allocation scheme;

a second field defining a number of symbols in the burst, a number of bits in this field being set to a minimum number required in view of the frame duration and the subcarrier allocation scheme;

a third field defining a subchannel offset of the burst, a number of bits in this field being set to a minimum number required in view of the total number of subchannels; and a fourth field defining a number of subchannels in the burst, a number of bits in this field being set to a minimum number required in view of the total number of subchannels.

In a preferred embodiment, each frame includes a downlink subframe and a uplink subframe, the frame configuration at least in the downlink subframe further comprising a plurality of zones using different subcarrier allocation schemes for transmissions from the base station to the subscriber stations, wherein both of said first and second fields are present in each control message, and wherein the numbers of bits in the first and second fields depend on the subcarrier allocation scheme used for the zone to which the burst belongs.

The subscriber stations in the system may be arranged to decode the control messages in accordance with size information of said control messages, which information is sent from the base station. Such size information can be sent within a downlink channel descriptor of its downlink subframe.

The system may be a SOFDMA system wherein the frame configuration currently in use can be changed by scaling in the time and/or frequency domain.

According to a third aspect of the present invention, there is provided a base station for use in a wireless communication system to communicate with a plurality of subscriber stations by transmitting and receiving data in units of frames, each frame having a configuration comprising a defined duration in time including a plurality of symbols, a defined extent in frequency including a total number of subchannels, and at least one subcarrier allocation scheme for grouping the subcarriers into subchannels, the base station arranged to: configure the frames in accordance with configuration information received over the network; construct successive frames to include a burst allocated to each of the subscriber stations respectively, each burst occupying part of said symbols and subchannels; and inform each of the subscriber stations of the characteristics of its allocated burst by sending a respective control message to each subscriber station; characterised in that the base station is arranged to determine the format of each control message in dependence upon the frame configuration currently in use, and to inform the subscriber stations of the control message format so determined.

each control message comprises a plurality of fields and the base station is arranged to determine the format of each control message by varying any of:

a first field defining a symbol offset of the burst, a number of bits in this field being varied in dependence upon the frame duration and the subcarrier allocation scheme;

a second field defining a number of symbols in the burst, a number of bits in this field being varied in dependence upon the frame duration and the subcarrier allocation scheme;

a third field defining a subchannel offset of the burst, a number of bits in this field is varied in dependence upon the total number of subchannels; and a fourth field defining a number of subchannels in the burst, a number of bits in this field is varied in dependence upon the total number of subchannels.

In a preferred embodiment the frames are OFDMA frames each comprising a downlink subframe and a uplink subframe, said control messages being provided for at least one of the downlink subframe and the uplink subframe, and the base station is arranged to inform each subscriber station of the control message format by adding information to a downlink channel descriptor included in the downlink subframe.

According to a fourth aspect of the present invention, there is provided a subscriber station for use in a wireless communication system to communicate with a base station by receiving and transmitting data in units of frames, each frame having a configuration comprising a defined duration in time including a plurality of symbols, a defined extent in frequency including a total number of subcarriers or subchannels, and at least one subcarrier allocation scheme for grouping the subcarriers into subchannels, the subscriber station being arranged to receive and decode, in each frame, a control message informing the subscriber station of a resource allocation within the frame; characterised in that:

the subscriber station is operable to decode the control message in accordance with size information of the control message received separately from the control message.

Here, the size information preferably comprises at least one of: a number of bits used in said control message to define a symbol offset of the resource allocation, a number of bits used in said control message to define a number of symbols occupied by the resource allocation, a number of bits used in said control message to define a subchannel offset of the resource allocation, and a number of bits used in said control message to define a number of subchannels occupied by the resource allocation.

The subscriber station may be adapted to communicate using OFDMA frames each comprising a downlink subframe and a uplink subframe, the control message concerning a resource allocation within at least the downlink subframe, the subscriber station arranged to decode the control message on the basis of size information added to a downlink channel descriptor of the downlink subframe.

The present invention further embraces software which, when executed by a processor of a base station or a subscriber station in a wireless communication system, provides the base station or the subscriber station, respectively, as defined above.

The present invention also provides a frame format used in a wireless communication system, the frame having a variable configuration comprising a defined duration in time divided into a plurality of symbols, a defined bandwidth divided into a plurality of subcarriers, and at least one subcarrier allocation scheme for grouping the subcarriers into subchannels, each frame containing at least one burst allocated to each of a plurality of subscriber stations respectively and each burst defined by a corresponding subset of said symbols and subchannels, wherein the frame format includes a control message by which each of the subscriber stations is informed of the characteristics of its allocated burst, said control message being of a size optimised for the frame configuration currently in use.

BRIEF DESCRIPTION OF THE DRAWINGS

Reference is made, by way of example only, to the accompanying drawings in which.

DETAILED DESCRIPTION

As outlined in the above introduction, in OFDMA-based communication systems (e.g. 802.16-2004 and 802.16e-2005), in order to allocate resources to each fixed or mobile subscriber station (MS) within its cell, the base station (BS) first schedules the two-dimensional (2×D, frequency and time dimension) resource allocation and the relevant transmission parameters, such as transmission power, modulation and coding schemes for the connections with each MS. Then the BS signals the allocation and the related information to each MS by using the MAP-IEs (MAP Information Elements) shown in FIG. 1. Each MAP_IE corresponds to one "burst" in the downlink, but each MAP_IE/burst can be used for multiple connections. Below, the MAP_IEs are also called "control messages".

However, in currently-proposed OFDMA based wireless communication systems such as 802.16e-2005, the overhead due to this control signalling in the physical layer is cumbersome, especially when a large number of users are scheduled per frame. This undesired overhead is mainly due to the structure of the MAP's, where a large number of bits are required to inform the MS of its resource within the frame. Such overhead occurs particularly in defining the DL allocation as explained above. In currently-proposed systems, definition of the UL allocation is less of a problem, although this may change in future systems. This overhead can cause serious capacity and throughput degradation especially when a large number of users are scheduled per frame. In this case, each user must be allocated a resource within the frame using the DL and UL MAP, and the DL and UL MAP_IE's. The main parameters within each of these MAP's that contribute to the large overhead are the 16 bit CID and the 2-D allocation bits (including Subchannel offset and symbol offset as explained below). Each of these entities are required per user, where in most cases, one user is allocated one burst per frame.

The frame structure of FIG. 1 has already been described in general terms, but will now be explained in more detail, so as to allow the above problem to be appreciated more clearly.

In the TDD frame structure, the first symbol is occupied by a Preamble which is mainly used for synchronisation purposes. On the second and third symbols following the Preamble is the FCH. The FCH is transmitted using a well-known format and provides sufficient information to decode the following MAP message, i.e. the MAP message length, coding scheme and active sub-channels. Following the FCH is the DL-MAP which may be followed by the UL-MAP. These MAP messages provide information on the allocated resource (slots) for traffic channels within the frame. These MAP's contain DL-MAP_IE's and UL-MAP_IE's which define bursts within the frames, (i.e. one MAP_IE will be related to 1 burst within the frame). The information within these control messages, such as the subchannel offset and symbol offset are crucial as these are used by the MS to locate the resource within the subframes. Other information such as the CID (Connection Identifier), the modulation and coding scheme and the number of subchannels are also crucial as these will allow for successful demodulation and decoding of the data within the burst. Sub-MAPs (by which users capable of using the same modulation scheme on their control signal are grouped together) and RCIDs (Reduced CIDs, which identify such groups of users with fewer bits than the full CID) can be used, in conjunction with a compressed MAP to minimize the overhead incurred in sending the above information. The above-mentioned messages are broadcast, i.e. transmitted to all users served by the BS, but the modulation and coding used on each Sub-MAP is varied based on the minimal requirement of the users scheduled in each message.

Following the DL and UL MAPs, there may be a Downlink Channel Descriptor (DCD) and/or an Uplink Channel Descriptor (UCD) present. The DCD and UCD will be transmitted by the Base Station (BS) at a periodic interval to define certain parameters pertaining to configuration and format of the downlink and uplink bursts. The DCD or UCD is transmitted on a fragmentable broadcast connection. It need not be transmitted every frame, typically it is sufficient to transmit a DCD once every few seconds (which may contain hundreds or thousands of frames) and the message may be fragmented and the fragments transmitted across a number of frames. This information, which is TLV (type, length, value) encoded, may include parameters such as, the TTG and RTG times, centre frequency, BS ID, frame duration and Handover type. Also contained within the DCD and UCD will be a description of the burst profiles that are used for bursts within the downlink and uplink subframes. This information will also be TLV encoded and may include information such as, FEC type, encoding rate and modulation. Once defined, these profiles will then be referred to in DL and UL MAP_IE's in later frames via a numerical index called Downlink Interval Usage Code (DIUC) and Uplink Interval Usage Code (UIUC). From decoding the DL-MAP_IE and UL-MAP_IEs (which contain the DIUC and UIUC respectively) the Mobile Station (MS) can determine the burst profile (i.e the modulation and coding scheme) which is utilized on its allocated bursts. If any of the configurations change within either of the TLV encoded information for the physical channel or the burst profiles then the DCD and/or UCD must be updated and transmitted as before. (i.e. after the DL and UL MAPs).

Considering the case where many users have been scheduled per frame, then the overhead incurred due to this signalling mechanism, more particularly the length of the MAP_IE control messages, can have a serious impact on the achievable capacity of the system which consequently results in a degradation of user throughput. Moreover, in order to provide full cell coverage, the broadcast MAP's, which must be transmitted at the slow but robust QPSK ½ rate, typically require one or more repetitions, to ensure that all users can successfully demodulate and decode the desired control information. In most cases the DL and UL MAP's will be repeated 4 or 6 times depending on the desired percentage of cell coverage and the prevailing propagation environment. It is obvious therefore, that the repeated broadcast data will significantly increase overhead within the frame and as a result, will decrease the capacity of the system.

In a current WiMAX based system, there are mechanisms for reducing the impact of large overhead due to having to ensure all users receive the broadcast control information, for example control information can be separated into up to three Sub-MAPs and one compressed MAP, and the modulation and coding scheme can be varied for each Sub-MAP. By using multiple sub-MAP messages, the control information for different users can be transmitted at more optimal rates base on their individual SINRs. Furthermore, it is possible to utilise reduced CIDs, which instead of the normal 16-bit value use a truncated 3, 7 or 11-bit basic CID in its place. However, the fundamental arrangement of medium access being based on 2-D allocation in the DL still yields an inefficient mechanism especially for supporting a large number of users. As mentioned before, the 2-D allocation elements will be present in every DL-MAP_IE. Table 1 highlights the number of bits used to represent the 2-D resource within the subframe for PUSC.

TABLE 1

| 2-D allocation bits | |
|---|---|
| 2-D Parameter | No. of bits |
| Symbol offset | 8 |
| Subchannel offset | 6 |
| No of symbols | 7 |
| No of subchannels | 6 |

As Table 1 shows, four parameters are normally used to define the resource allocation (burst) in 2-D, at least for the DL resource allocation in currently-proposed WiMAX systems. The Symbol offset and No. of Symbols determine the start point and extent of the burst in the time dimension. The subchannel offset and number of subchannels define the location and extent of the burst in the frequency dimension. In every DL-MAP_IE, these bit values (that is, the numbers of bits occupied by respective fields of each control message) are fixed and cannot be changed at any time (Note, in the UL-MAP_IE the 2-D allocation bits are only required for CDMA ranging allocation which will be indicated through UIUC=12). However, the inventors have realized that it would be beneficial to allow the number of bits used for one or more of the above values to be variable, to size the control message appropriately for the frame format in use. In principle, any one or more of the above four parameters could be made variable in length although in practice, they can be grouped into two pairs as follows, which is possible due to the combination of SOFDMA with variable frame sizes.

A first measure is to make the number of bits used for Symbol offset and No. of Symbols variable, as these can be determined by the DL subframe length which will be predetermined. Initially, during the development of the IEEE 802.16 standard, these values were based on an FFT of 2048 and a frame duration of 20 ms for the OFDMA PHY. However, it is widely known that 20 ms frames are inadequate for supporting users travelling at medium to high mobility. In general, a 5 ms frame is favoured as the optimum duration therefore the number of bits needed to represent the Symbol offset and No. of Symbols will be less than 8 and 7 respectively. Moreover, in a TDD system the actual DL subframe duration will be typically even shorter in duration, and in future evolutions may be further reduced to improve mobility support.

A second measure is to make the number of bits used for Subchannel Offset and No. of Subchannels variable. The 6-bit fields indicated in Table 1 are set to accommodate a 2048 FFT size, but not all practical WiMAX systems will use 2048 FFT. Currently in the WiMAX forum profiles, only a 512 and 1024 FFT size are utilised. In practice, it may be that once a system has been set up the same FTT size will be maintained; however, at least in some applications it will be possible to reduce the bit lengths of these values as well.

Thus, the non-scalable values shown in Table 1 are fixed for the worst case scenario (e.g. 20 ms frame with 2048FFT), resulting in an unnecessary and increased signalling overhead especially when a large number of users are scheduled per frame.

Thus, the present invention provides a novel signalling mechanism in which the numbers of bits used in control messages to indicate the 2-D resource allocation are reduced, and optimised for the particular frame configuration. Typically, both the frame duration and the FFT could be reconfigurable, in which case up to all four parameters listed in Table 1 and used in the control message may be sized appropriately in the base station.

The Symbol offset and No. of Symbols are scalable to the frame duration and the subcarrier allocation scheme used for the zone to which the DL-MAP_IE is associated. Optionally also, or instead, the subchannel offset and number of subchannels can be optimised based on the selected FFT size. Any or all of these values (that is, the numbers of bits in each field used to represent the above parameters) can be TLV encoded and transmitted within the DCD. As mentioned above, the DCD is only transmitted periodically, so the values used for the lengths of the parameter fields will not add overhead to every frame. Therefore, in subsequent frames the MS will then know the number of bits being used to represent these parameters, and hence know the field sizes in the DL-MAP IE. An alternative, though less preferable possibility is to put the length information in the FCH; this is less efficient as the same information would be needlessly transmitted in every frame.

In some systems, there may be no need to change the frame configuration once an appropriate frame duration/FFT size have been determined. In such a case the MSs may be configured in advance, possibly during manufacture or before deployment, setting the size of each field in the control message. In other systems, as is provided for in SOFDMA, it may be desirable for the frame configuration to be reconfigured dynamically, so that different values may become appropriate for the bit lengths in the MAP_IEs. If these values need to be changed for any reason, then the DCD can be updated and transmitted using the new TLV encoded parameters.

This method can potentially be very beneficial with regards to reducing overhead especially in the case where a short frame duration (i.e. 2 ms) is selected. In this case, only a small number of bits will be required to represent the Symbol offset and No. of Symbol parameters. If these values are scalable to the frame duration and sub-channelisation scheme then the signalling overhead can be reduced somewhat compared to the existing IEEE 802.16e-2005 system.

As mentioned previously, an embodiment of the present invention allows the 2-D allocation bit-field sizes within the DL-MAP_IE and if required, the UL-MAP_IE, to be scalable. Moreover, these bits can also be scalable to the subcarrier allocation scheme used within the zone that the burst has been allocated in. In the case where the burst has been allocated within a Partially Used Sub-Carriers (PUSC) zone then the number of bits used to represent Symbol offset and No. of Symbols can be reduced further. The reason for this is that a PUSC slot is defined as one Subchannel by two OFDMA symbols, therefore, for the entire zone only multiples of 2 will be required to indicate the Symbol offset and No. of Symbols. However, in the case where the burst has been allocated within an Adaptive Modulation and Coding (AMC) zone, then the number of bits used to represent Symbol offset and No. of Symbols can be reduced yet again. This is because in the case where the configuration of AMC is 2×3 then the slot is defined as being 54 subcarriers (including pilots) over three OFDMA symbols, therefore, for the entire zone only multiples of 3 will be required to indicate the Symbol offset and No. of Symbols.

Figure 2:
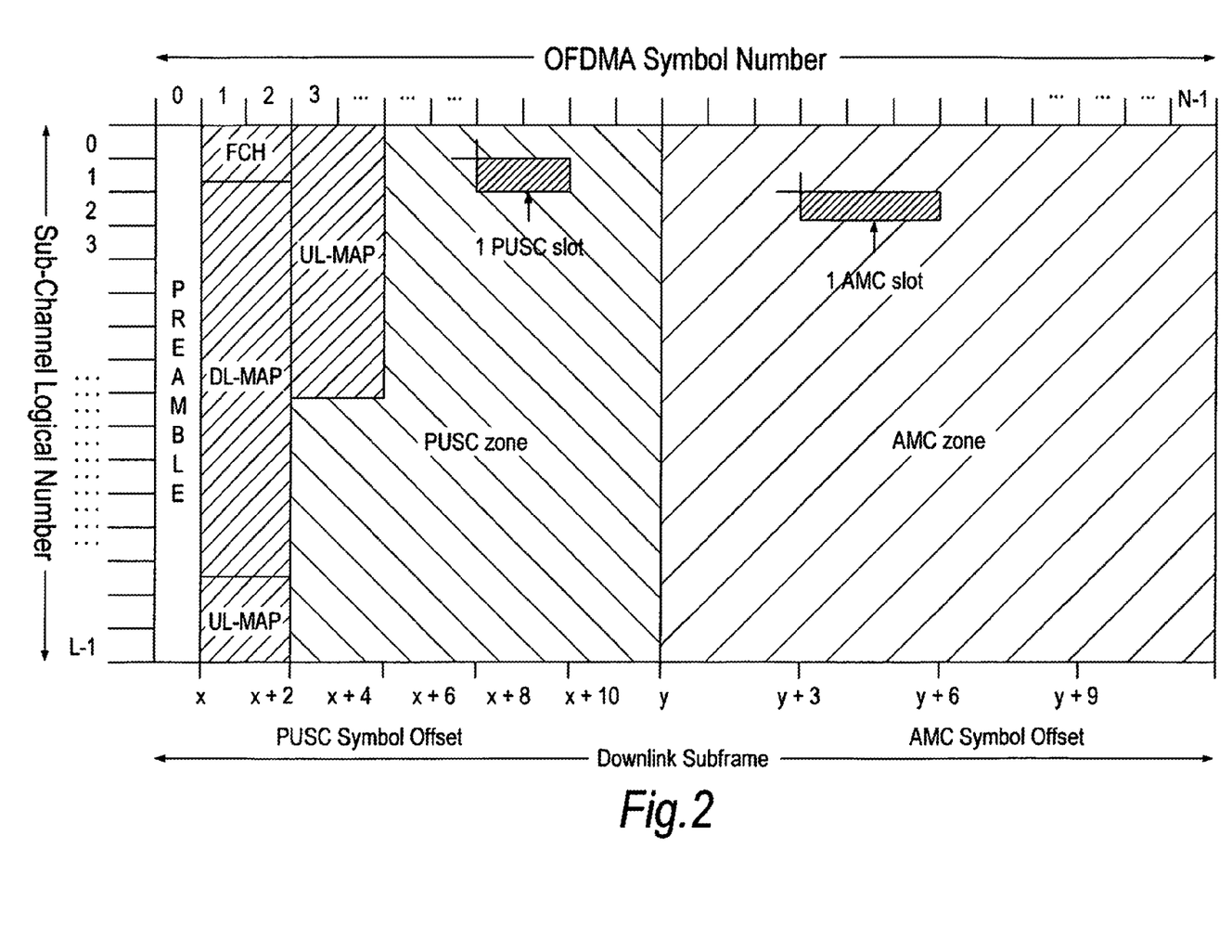
FIG. 2 shows an OFDMA frame structure having zones for PUSC and AMC.

The two cases described here are illustrated in FIG. 2 for a downlink subframe. From FIG. 2, it is clear that there are two zones, PUSC and AMC. The MS will be informed within the DL-MAP by means of a DL Zone Switch IE of which zone that it will be allocated resources. Therefore, referring to FIG. 2, the value of the AMC symbol offset y will be determined from the DL Zone Switch IE. Note, by default the first zone in every frame in the current OFDMA WiMAX system is PUSC, therefore, the value of the PUSC symbol offset x shall be 1.

Figure 3:
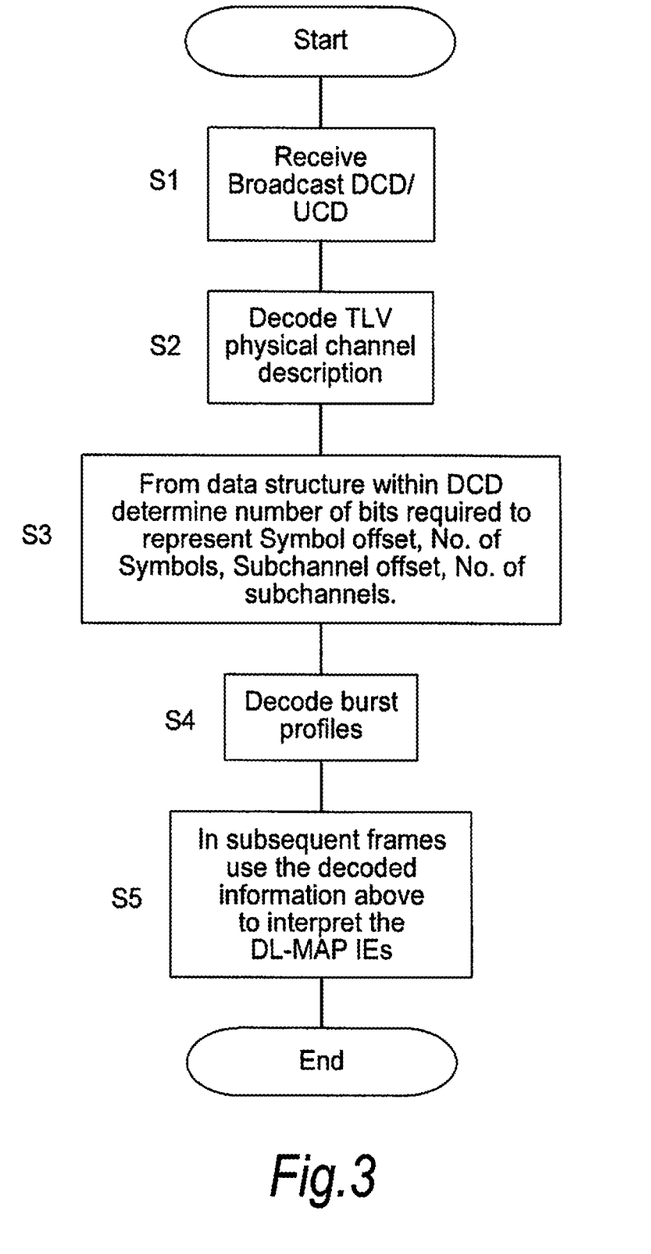
FIG. 3 is a flowchart of a method embodying the present invention for determining the values that will be used to represent Symbol offset, No. of Symbols, Subchannel offset and No. of Subchannels.

Referring to FIG. 3, the following steps are required to determine the number of bits that will be required to represent the Symbol offset and No. of Symbols within the DL-MAP_IEs. Note, the UL-MAP_IE will not be accounted for as the 2-D elements are only required for allocating the CDMA ranging channel.

(S1) Receive the broadcast DCD. As mentioned before this will contain information regarding the configuration of the physical channel and information concerning the burst profiles.

(S2 and S3) Decode the TLV information that describes the physical channel. From this information, the MS will be notified of many parameters some of which have been described previously. In particular, the physical channel configuration parameters that determine minimum number of bits that will be required to represent the Symbol offset, No. of Symbols, Subchannel offset and No. of subchannels within the DL-MAP_IEs for both PUSC and AMC zones.

(S4) Decode the TLV information that describes the burst profiles (i.e. the modulation and coding scheme).

(S5) Use all decoded information within DCD in subsequent frames to interpret the DL-MAP_IEs, until the physical channel parameters are changed or a time-out for refresh is reached.

Some possible implementations of the above method will now be explained.

Table 2 summarises the required size for each of the four IE fields for the extremes of frame configuration supported by the WiMAX forum profiles when using PUSC, as well as the current field sizes used in the standard. The table indicates the resulting IE overhead in bits for the case of 10 IEs being included and the total overhead assuming one Sub-MAP is utilised (which requires usage of the compressed MAP, Sub-MAP pointer and the SubMAP message).

TABLE 2

Summary of required signalling bit field size in the DL MAP IE for current WiMAX systems

| Scenario | Symbol Offset | No. Symbols | Subchannel Offset | No. Sub-channels | IE Overhead (bits) | Total overhead (bits) | % reduction in signalling overhead |
|---|---|---|---|---|---|---|---|
| 802.16 Standard | 8 | 7 | 6 | 6 | 510 | 709 | — |
| 1024 FFT with 35 DL symbols (WiMAX forum ™ profile) | 5 | 5 | 5 | 5 | 440 | 639 | 9.9% |
| 1024 FFT with 26 DL symbols (WiMAX forum ™ profile) | 4 | 4 | 5 | 5 | 420 | 619 | 12.7% |
| 512 FFT with 35 DL symbols (WiMAX Forum ™ profile) | 5 | 5 | 4 | 4 | 420 | 619 | 12.7% |
| 512 FFT with 26 DL symbols (WiMAX Forum ™ profile) | 4 | 4 | 4 | 4 | 400 | 599 | 15.5% |

From Table 2 it can be appreciated that if the variable field length technique had been utilised for the IEEE 802.16 system then the overhead could have been reduced by between 9.8% and 15.5% for the profile considered, this would have been in return for an extra 2 bytes (16 bits) in the DCD message. Note: the 16 bits would be: 3 bits for the field size of the four variables and an extra 4 bits of padding to round up to the nearest byte.

In terms of future evolution, it can be expected that the standard and profiles will be extended to support shorter frame durations (of around 1 or 2 ms) and possibly larger FFT sizes (of 2048 and 4096). Comparing these potential frame configurations in Table 3 gives an indication of the variability that can arise and the overhead that will result if either the current field sizes are maintained, or at least they are adjusted to account for the worst case scenario.

To appreciate what this overhead reduction translates to in terms of a capacity increase, some examples are given in Table 4.

TABLE 4

Examples of Capacity Gain in Present Invention

| Scenario | Signalling type | Map overhead | | | Available data slots | % Capacity gain |
|---|---|---|---|---|---|---|
| | | Bits | Slots | Symbols | | |
| 1k FFT, 35 sym | Existing | 709 | 90 | 9 | 320 | 9.4% |
| | Proposed | 639 | 84 | 8.4 | 350 | |
| 512 FFT, 26 symbols | Existing | 709 | 90 | 18 | 80 | 37.5% |
| | Proposed | 599 | 78 | 15.6 | 110 | |

TABLE 3

Summary of required signalling bit field size in the DL MAP IE for future WiMAX systems

| Scenario | Symbol Offset | No. Symbols | Subchannel Offset | No. Sub-channels | IE Overhead (bits) | Total overhead (bits) | % reduction in signalling overhead (rel. to standard) | % reduction in signalling overhead (rel. to worst case) |
|---|---|---|---|---|---|---|---|---|
| 802.16 Standard | 8 | 7 | 6 | 6 | 510 | 709 | — | — |
| 2 ms frame with 14 symbols and 512 FFT | 3 | 3 | 4 | 4 | 380 | 579 | 18.3% | 21.7% |
| 2 ms frame with 14 symbols and 1024 FFT | 3 | 3 | 5 | 5 | 400 | 599 | 15.5% | 18.9% |
| 2 ms frame with 14 symbols and 2048 FFT | 3 | 3 | 6 | 6 | 420 | 619 | 12.7% | 16.2% |
| 2 ms frame with 14 symbols and 4096 | 3 | 3 | 7 | 7 | 440 | 639 | 9.9% | 13.5% |
| 5 ms frame with 35 symbols and 4096 FFT | 5 | 5 | 7 | 7 | 480 | 679 | 4.2% | 8.1% |
| 20 ms frame with 4096 FFT | 8 | 8 | 7 | 7 | 540 | 739 | — | — |

TABLE 4-continued

Examples of Capacity Gain in Present Invention

| Scenario | Signalling type | Map overhead | | | Available data slots | % Capacity gain |
|---|---|---|---|---|---|---|
| | | Bits | Slots | Symbols | | |
| 1k FFT, 14 symbols | Existing | 709 | 90 | 9 | 40 | 75% |
| | Proposed | 599 | 78 | 7.8 | 70 | |

In the above table, it is assumed that the map is repeated 6 times and is QPSK ½ rate encoded, the length of a reduced CID is 7 bits, a compressed MAP+SubMAP pointer and SubMAP is transmitted in segmented PUSC zone and 4 (for 35 sym/5 ms case) or 2 (for 14 sym/2 ms case) further symbols used for data transmission in a segmented zone and the remainder are used for data transmission in a use-all-subchannels zone.

From Table 4 it can be appreciated that the for the first scenario, a corresponding reduction in signalling overhead of 9.9% would result in a capacity increase of something around 9.4% (depending on the exact frame configuration). Whereas for the second and third scenario, a reduction in signalling overhead of 15.5% in both cases, would result in a capacity increase of 37.5% and 75% respectively.

To summarise, the invention provides a signalling mechanism in an OFDMA wireless communication system in which the number of bits used to indicate the 2-D resource allocation in each frame are reduced, and optimised for the particular frame configuration. In systems where the frame duration is variable, the numbers of bits within the MAP-IEs in at least the DL_MAP and optionally also the UL_MAP of each frame, used to represent the Symbol offset and No. of Symbols, are scaled to the frame duration and the subcarrier allocation scheme used for the zone to which the DL-MAP_IE is associated. Likewise, in systems where the FFT size (bandwidth) is variable, a variable number of bits is used for the subchannel offset and number of subchannels, which can be optimised based on the selected FFT size and subcarrier allocation scheme. The bit numbers in use can be TLV encoded and transmitted within a downlink channel descriptor following the DL_MAP and UL_MAP. Therefore, in subsequent frames each subscriber station knows the number of bits being used to represent these parameters, and thus the field sizes in the MAP_IEs, until such time as the DCD is updated. In this way, the signalling overhead incurred by the MAP_IEs, which can be significant for a large number of users and with some frame and FFT sizes, is reduced.

The above description assumes that the BS determines the optimum field sizes in the MAP_IEs, but it is not essential for each BS to decide this individually. Messages transmitted to each BS in the system from a central control can be used to set the frame configuration and the structure of the MAP_IEs.

It is anticipated that there will be considerable future demand for systems based around SOFDMA (scalable in both frequency and time domain), since one of its key benefits is that operators can choose to optimise the frame configuration based on their requirements. In such systems, the present invention will provide the useful effect of allowing dynamically-variable field sizes for the IEs that define the 2D bursts. Even in non-scaleable systems, where these employ a frame size different from the worst-case scenario mentioned above (20 ms, 2048FFT), the invention can usefully be applied on a one-off basis to set the field sizes optimally for the frame size employed.

Therefore, the features in the preferred embodiment of:
Making the fields used to describe the 2D allocation in the signalling message (e.g. DL-MAP_IE) variable in size;
Using a first control signal (e.g. DCD) which can be recovered without the need to know the field sizes to indicate the configuration of the field sizes in a second control signal (e.g. DL-MAP_IE); and
Using the information provided in the first configuration message to configure the second message interpretation mechanism so that it can correctly process and understand the second configuration message can be significantly advantageous towards ensuring minimal signalling overhead.

Although described above in terms of a novel signaling method in a wireless communication system, the present invention may take the form of a novel BS or MS, or hardware modules for the same, and can be implemented by replacing or modifying software executed by processors of the BS and/or each MS. In a wireless communication system employing relay stations having at least some of the functionality of a base station, the present invention may also be applied to such relay stations.

Thus, embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of the above-described subsystem. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Although the above description has referred to an IEEE 802.16e-2005 wireless communication system by way of example, the invention may be applied to other frame-based communication systems in which resource allocation is made on a frame-by-frame basis.

The invention claimed is:

1. A wireless communication method in which a base station communicates with a plurality of subscriber stations in units of frames, each frame being configured to have a certain duration in time comprising a plurality of symbols, a certain frequency bandwidth comprising a total number of subcarriers, and at least one subcarrier allocation scheme for grouping the subcarriers into sub-channels, each frame containing a burst allocated to each of the subscriber stations respectively and each burst occupying a corresponding subset of said symbols and sub-channels, each of the subscriber stations being informed of the characteristics of its allocated burst by a respective control message comprising one or more fields sent from the base station;
the method comprising:
varying the lengths of one or more fields comprised in the control messages to define the characteristics of the burst, in dependence upon the frame duration currently in use;
wherein each control message includes a first field defining a symbol offset of the burst, and a number of bits in this field is set in dependence upon the frame duration and the subcarrier allocation scheme.

2. The wireless communication method according to claim 1 wherein each control message includes a second field defining a number of symbols in the burst, and a number of bits in this field is set in dependence upon the frame duration and the subcarrier allocation scheme.

3. The wireless communication method according to claim 1 wherein each control message includes a third field defining a sub-channel offset of the burst and a number of bits in this field is set in dependence upon the total number of sub-channels.

4. The wireless communication method according to claim 1 wherein each control message includes a fourth field defining a number of sub-channels in the burst, and a number of bits in this field is set in dependence upon the total number of sub-channels.

5. The wireless communication method according to claim 1 wherein the frame configuration further comprises a plurality of zones using different subcarrier allocation schemes for transmissions between the base station and the subscriber stations, and wherein the numbers of bits in the first and second fields depend on the subcarrier allocation scheme used for the zone to which the burst belongs.

6. The wireless communication method according to claim 1 further comprising specifying by the base station, in at least one said frame, information specifying the lengths of said one or more fields which are varied.

7. The wireless communication method according to claim 6 further comprising changing the frame configuration currently in use to another frame configuration having a different time duration, frequency bandwidth, and/or subcarrier allocation scheme, and the base station newly specifying, in the next frame, said information specifying the lengths of said one or more fields.

8. The wireless communication method according to claim 6 wherein after carrying out said specifying in one frame, said specifying is omitted for successive frames until the frame configuration currently in use is changed or a time-out for refresh is reached.

9. A wireless communication system in which a base station communicates with a plurality of subscriber stations in units of frames, each frame having a variable configuration comprising a defined duration in time including a plurality of symbols, a defined extent in frequency including a total number of subcarriers, and at least one subcarrier allocation scheme for grouping the subcarriers into sub-channels, each frame containing a burst allocated to each of the subscriber stations respectively and each burst defined by a corresponding subset of said symbols and sub-channels, each of the subscriber stations being informed of the characteristics of its allocated burst by a respective control message sent from the base station; the system comprising:

the base station is configured to construct each control message with a size dependent upon the frame duration currently in use; and vary the lengths of one or more fields comprised in the control messages to define the characteristics of the burst, in dependence upon the frame configuration currently in use.

10. A base station for use in a wireless communication system to communicate with a plurality of subscriber stations by transmitting and receiving data in units of frames, each frame having a configuration comprising a defined duration in time including a plurality of symbols, a defined extent in frequency including a total number of subcarriers, and at least one subcarrier allocation scheme for grouping the subcarriers into sub-channels, comprising:

the base station arranged to:

configure the frames in accordance with configuration information received over the network;

construct successive frames to include a burst allocated to each of the subscriber stations respectively, each burst occupying at least part of said symbols and at least part of said sub-channels;

inform each of the subscriber stations of the characteristics of its allocated burst by sending a respective control message to each subscriber station;

determine the format of each control message in dependence upon the frame duration currently in use, and to inform the subscriber stations of the control message format so determined; and vary the lengths of one or more fields comprised in the control messages to define the characteristics of the burst, in dependence upon the frame configuration currently in use.

11. A subscriber station for use in a wireless communication system to communicate with a base station by receiving and transmitting data in units of frames, each frame comprising a duration in time including a plurality of symbols, a defined extent in frequency including a total number of subcarriers, and at least one subcarrier allocation scheme for grouping the subcarriers into sub-channels, the subscriber station being arranged to receive and decode, in each frame, a control message informing the subscriber station of a resource allocation within the frame; comprising:

the subscriber station configured to decode the control message in accordance with size information of the control message received separately from the control message;

wherein the lengths of one or more fields, comprised in the control messages to define the characteristics of the burst, are varied in dependence upon the frame duration currently in use.

* * * * *